Feb. 24, 1948.                S. JOHANSON                2,436,574
                              BINOCULAR MOUNT
                            Filed Feb. 14, 1945            2 Sheets-Sheet 2
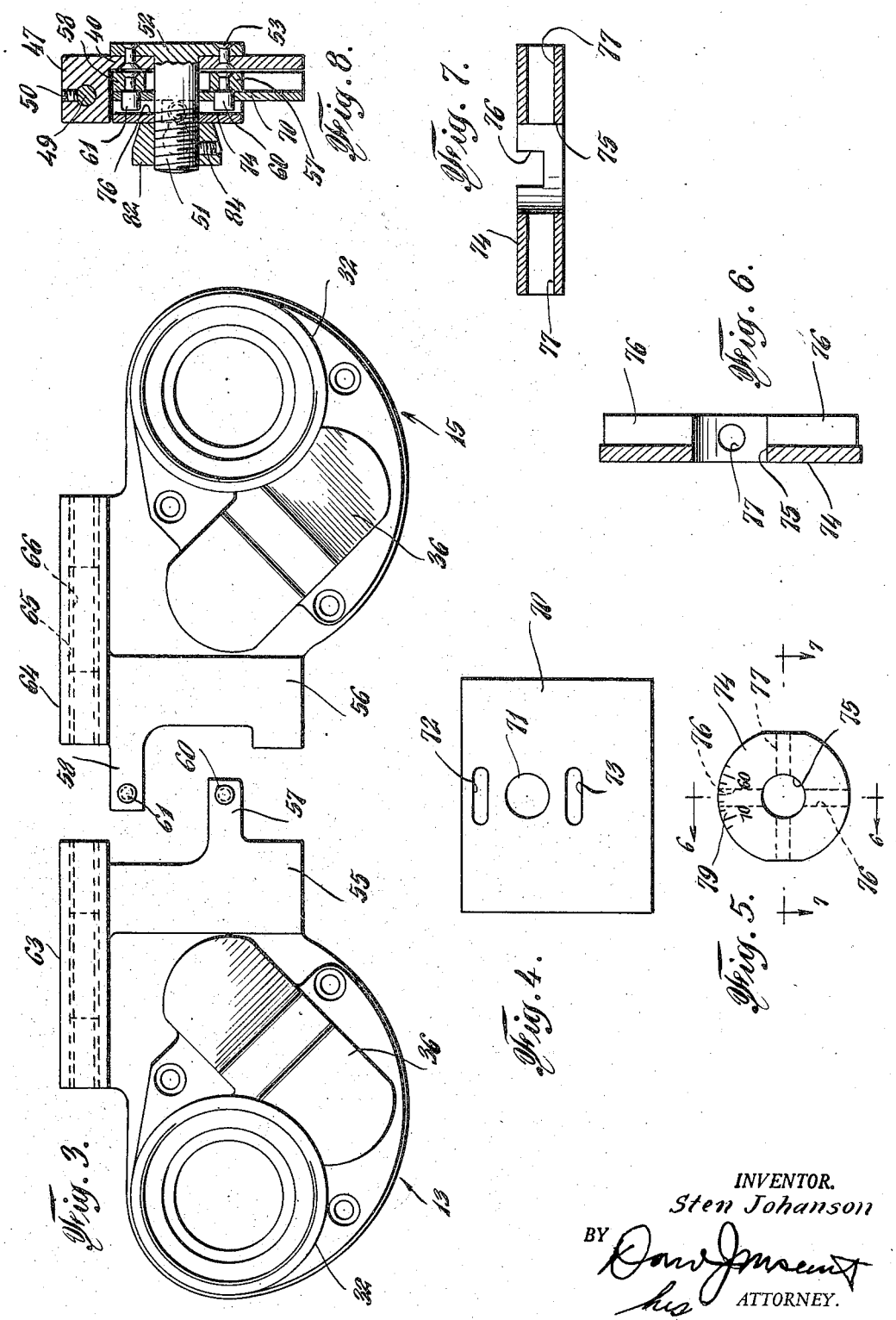
INVENTOR.
Sten Johanson
BY
ATTORNEY.

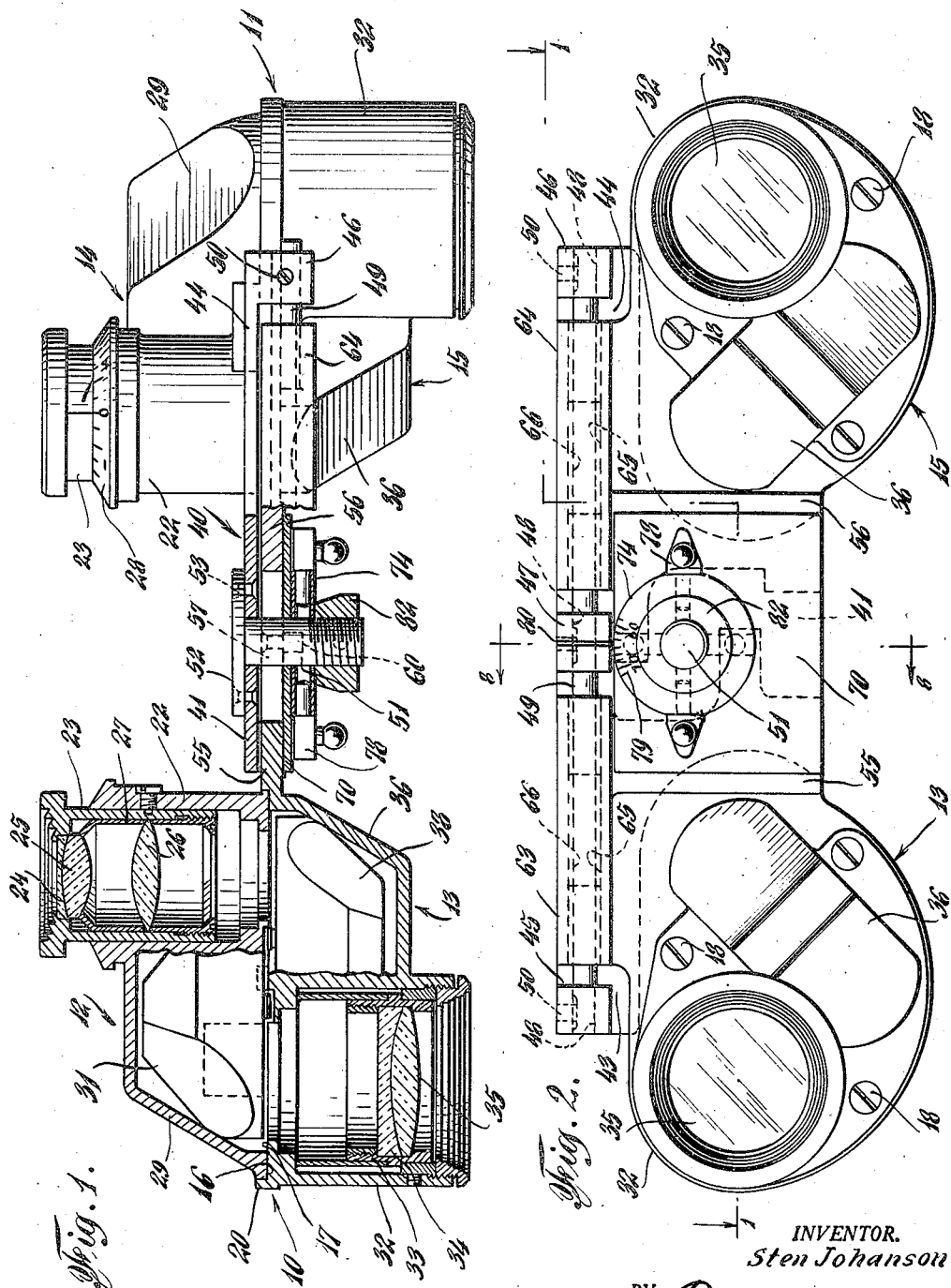

Patented Feb. 24, 1948

2,436,574

UNITED STATES PATENT OFFICE 2,436,574

BINOCULAR MOUNT

Sten Johanson, New York, N. Y., assignor to Universal Camera Corporation, New York, N. Y., a corporation of New York Application February 14, 1945, Serial No. 577,874

8 Claims. (Cl. 88—34)

1

This invention generally relates to optical instruments and is more specifically directed to a novel and improved construction of binoculars.

It is an object of the invention to provide housings for the optical systems of the binocular which are so constructed as to be adapted for assembly with a rigid element of the instrument, and means operable to simultaneously displace the binocular housings away from or toward one another between two extreme positions thereof thereby to effect the interocular adjustment of the instrument.

These and other related objects will become apparent in the following description of a preferred embodiment of the invention illustrated in the drawings, wherein:

Fig. 1 is a top plan view of a binocular according to the invention, partly in horizontal section on line 1—1 of Fig. 2, illustrating the structure of the housings for the optical systems of the binocular and the elements of the instrument associated therewith.

Fig. 2 is a front elevational view of the binocular of Fig. 1.

Fig. 3 is a plan view of the sections of the instrument housings which carry the objectives, shown isolated.

Fig. 4 is a plan view of a plate associated with portions of the objective sections of the housings.

Fig. 5 is a plan view of a rotatable disc for controlling the interocular adjustment of the instrument.

Fig. 6 is an enlarged vertical section through the disc of Fig. 5, on line 6—6 of said figure.

Fig. 7 is an enlarged horizontal section through the disc, on line 7—7 of Fig. 5.

Fig. 8 is a vertical section through the binocular, on line 8—8 of Fig. 2.

Referring now in detail to the drawings, numerals 10 and 11 generally indicate the right hand and left hand bodies or housings for the optical systems of the instrument, which consist of matable eye piece and objective sections 12, 13 and 14, 15, respectively, having one open end and preferably made of suitable light metal castings.

As illustrated in Fig. 1, the eye piece and the objective section of each housing are joined at their open ends in surface abutting engagement along their respective flat end faces 16 and 17, by means of a plurality of screws 18 (see Fig. 2), inwardly of the peripheral shoulder 20 of the objective section which surroundingly engages the outer periphery of the end of the eye piece sec-

2 tion. This latter comprises an integral openended cylindrical element 22 wherein there is suitably mounted an eye piece 23, which is rotatably and axially displaceable relative to the element 22 for focusing adjustment. The eye piece incorporates suitable eye lenses 24, 25 and a field lens 26, mounted in a barrel member 27. Diopter graduations are applied to the outer surface of the cylindrical element 22, as shown at 28, to permit control of the eye piece adjustment.

Each eye piece section also embodies an integral hollow portion 29 extending transversely thereof, which defines a cavity adapted to receive and seat a Porro prism 31 arranged with its hypotenuse face opposed to the adjacent objective section, suitable means being provided for holding the prism within the cavity in adjusted position relative to the other elements of the optical system of which it forms part.

Each objective section likewise comprises a cylindrical open-ended element 32 mounting a barrel member 33 which incorporates objective lenses 34 and 35, a hollow portion 36 extends transversely of the objective section, at a right angle to the hollow portion 29 of the eye piece section, to define a cavity conformed to accommodate a prism 38 with the hypotenuse face thereof opposed to that of the prism 31. As will be evident, the joined eye piece and objective sections form comparatively small, compact and readily assembled housings for the right and left hand optical systems of the binocular.

The remaining elements of the binocular structure adapted to be assembled with the housings 10 and 11 to form the complete instrument, will now be described.

The structure comprises a rigid member or plate 40 having a reduced lower portion 41, which extends between the two housings in the assembled condition of the binocular, and an upper portion embodying oppositely extending arms 43, 44 (see Figs. 1 and 2) the ends whereof are formed with integral projecting elements or supports 45, 46, a third similar support 47 being provided intermediate the supports 45, 46. The supports have alined bores 48 adapted to receive a shaft 49 extending therethrough and fixedly secured therein as by means of set screws 50.

A stud 51 having its head 52 fastened to the rear face of the plate 40 as by means of rivets 53, projects through an opening provided in the center of the plate, underneath and in alinement with the support 47, the free end of the stud being threaded for the purpose that will become hereafter apparent.

The objective sections 13 and 15 of the housings 10, 11 have laterally projecting flat portions 55, 56, respectively, embodying extensions 57, 58 which carry at their free ends pins 60, 61. The objective sections are furthermore provided at their upper end with thickened integral portions or extensions 63, 64, respectively, which are longitudinally bored, as shown at 65; bushings 66 are mounted in the bores to provide an accurate sliding fit for the shaft 49 (see particularly Figs. 2 and 3).

The housings are assembled with the plate 40 by mounting the aforementioned extensions 63, 64 of the objective sections on the shaft 49 with the rear face of the projecting flat portions 55, 56 in juxtaposition to the plate 40. A plate 70 is mounted on the stud 51, which passes through an opening 71 in the plate, and is juxtaposed to the aforesaid portions 55, 56, the plate 70 being also slotted as shown at 72, 73 to permit passage of the pins 60, 61.

A disc 74, centrally apertured as shown at 75, is rotatably mounted on the stud 51 in juxtaposed relation to the plate 70, and is provided in its rear face with alined radially extending grooves 76 adapted to slidingly receive the pins 60, 61 projecting from the plate 70 through the slots 72, 73 thereof. Radial bores 77 extend into the disc at a right angle to the grooves 76 to frictionally receive and retain one end of projecting handles 78 provided for rotating the disc. This latter also has graduations 79 readable against an index mark 80 on the central support 47 of the plate 40 aforementioned.

A locking knob 82 is mounted on the threaded forward end of the stud 51 in juxtaposition to the disc 74 to maintain the associated elements in assembled relation, and is longitudinally adjusted on the stud to the position required for permitting ready rotation of the disc relative to the plate 70 and sliding movement of the portions 55, 56 of the objective sections of the housings between the confining plates 40 and 70 without any objectionable play. Of course, the associated elements of the structure will be accurately machined and finished to provide smooth contact surfaces and prevent any objectionable friction therebetween. The knob 82 may be secured in its adjusted locking position by means of a set screw 84, as shown in Fig. 8.

As clearly illustrated in Fig. 2, the length of the extensions 63, 64 of the objective sections slidably mounted on the shaft 49, is less than the length of the portions of the shaft comprised between the shaft supports 45, 47 and 47, 46 respectively. The housings 10 and 11 are therefore movable away from and toward one another to effect interocular adjustment of the instrument between extreme outer and inner positions defined by the abutting engagement of the ends of said extensions 63, 64 of the objective sections with the shaft supports. On the other hand, since the width of the portions 55, 56 of the objective sections is greater than the total lateral displacement thereof allowed by the shaft supports, said portions will always be contained between the plates 40 and 70 which will guide the portions and therefore the housings for movement in a fixed plane.

The associated parts are so dimensioned and arranged that, in the central position of the extensions 63, 64 of the objective sections, relative to the portions of the shaft 49 whereon they are mounted, the pins 60, 61 and the grooves 76 of the disc 74 will be in vertical alinement. It will be apparent that by rotating the disc 74 in opposite directions to angularly displace the grooves 76, the pins 60, 61 slidingly received within the grooves will be simultaneously displaced therealong and away from or toward one another, thereby causing the housings to move between the extreme positions thereof aforementioned to effect the desired interocular adjustment of the instrument.

It should be noted that the structure described, while providing means for readily effecting and controlling the interocular adjustment of the binocular, permits to eliminate entirely the use of hinge connections between the housings and all the shortcomings inherent in such devices. On the other hand, the required parallelism between the optical axes of the instrument is insured and constantly maintained in the operation of the instrument, since the housings are constrained to move in the same plane being supported and guided by a single shaft 49 and embodying flat rigid portions of comparatively wide area confined between and guided by the opposed plane surfaces of the fixed rigid plates 40 and 70.

It is to be understood that while I have described the invention substantially with reference to a preferred embodiment thereof, changes and modifications may be made in the structure described and illustrated in the drawings without departing from the spirit of the invention or exceeding the scope of the claims.

I claim:

1. A binocular comprising a plate, a horizontal shaft carried by said plate, a pair of housings for the optical systems of the instrument, each of said housings having an extension slidably mounted on said shaft and a flat projecting portion juxtaposed to said plate and carrying a pin, a second plate juxtaposed to said projecting portions of the housings having slots for the passage of said pins, a stud carried by the first-mentioned plate and extending outwardly of said second plate, means rotatably mounted on said stud in juxtaposition to the second plate and engaging said pins for simultaneously displacing the pins and therefore the housings away from and toward one another, and means mounted on said stud for maintaining the aforementioned rotatable means, the plates and the projecting portions of the housings in juxtaposed relation.

2. In a binocular, a plate, a shaft carried by said plate parallel to one face thereof, a pair of housings for the optical systems of the instrument, each of said housings having a bored extension and being thereby slidably mounted on said shaft and having a flat laterally projecting portion slidingly engaging the plate, a stud fixed to the plate, a second plate mounted on said stud for maintaining said projecting portions of the housing in sliding engagement with the first mentioned plate, and means on said stud connected with the projecting portions of the housings for actuating the housing away from and toward one another.

3. In a binocular, a plate, a fixed shaft carried by said plate parallel to one face thereof, a pair of parallel housings for the optical systems of the instrument slidably supported by said shaft, for movement away from and toward one another, said housings embodying oppositely projecting portions slidingly engaging said plate, a fixed stud projecting from the plate between said projecting portions of the housings, a second plate mounted on said stud in sliding engagement with said projecting portions of the housings, rotatable means mounted on the stud in sliding engagement with said second plate and connected to the projecting portions of the housings for actuating the housings away from and toward one another, and means on the stud for locking said rotatable means in sliding engagement with the second plate.

4. In a binocular, a plate having a lower reduced portion, a horizontal shaft carried by and extending parallel to one face of said plate above said reduced portion thereof, a pair of housings for the optical systems of the instrument disposed perpendicularly of the plate at opposite sides of the reduced portion, each of said housings being slidably supported on said shaft and having a laterally projecting portion juxtaposed to the reduced portion of the plate and carrying a pin, a second plate juxtaposed to said projecting portions of the housings having openings for the passage of said pins, a stud fixed to the first-mentioned plate and extending through said second plate, rotatable means mounted on said stud in juxtaposition to the second plate and connected with the pins for actuating the housings away from and toward one another, and adjustable means on the stud for maintaining said rotatable means in juxtaposed relation to the second plate.

5. In a binocular, a flat rigid member, a fixed support carried by said member parallel to one face thereof, a pair of housings for the optical systems of the binocular slidably mounted on said support for rectilinear motion away from and towards one another, each of said housings having a lateral extension slidingly contacting said rigid member, a fixed element projecting from said rigid member, means rotatably mounted on said projecting element connected with the lateral extensions of said housings for actuating said housing away from and toward one another to effect interocular adjustment of the binocular, and means mounted on said projecting element for maintaining said lateral extensions in sliding engagement with said rigid member during the relative motion of said housings.

6. In a binocular, a flat rigid member, a fixed support carried by said member parallel to one face thereof, a pair of housings for the optical systems of the binocular slidably mounted on said support for rectilinear motion away from and towards one another, each of said housings having a lateral extension slidingly contacting said rigid member, a fixed element projecting from said rigid member, means mounted on said projecting element for maintaining the extensions of said housings in contact with said rigid member and in sliding engagement therewith during the relative motion of said housings, a member rotatably mounted on said projecting element, means for rotating said rotatable member, guideways in said rotatable member, and means fast to said extensions of said housings and engaging said guideways for actuating said housings away from and towards one another to effect interocular adjustment of the binocular in response to a rotation of said rotatable member.

7. In a binocular, a plate, a shaft carried by said plate parallel to one face thereof, a pair of housings for the optical systems of the binocular, each of said housings consisting of two sections joined together and one of the sections of each housing having an integral extension slidably mounted on said shaft and an integral flat projecting portion in sliding engagement with said plate, a stud carried by said plate, a rotatable means mounted on said stud and operatively connected with said flat projecting portions for displacing said housings away from and towards one another to effect interocular adjustment of the binocular, and means mounted on said stud for maintaining said flat projecting portion in sliding engagement with said plate.

8. A binocular comprising a plate, a shaft carried by said plate parallel to one face thereof, a pair of housings for the optical systems of the binocular, each of said housings having an extension slidably mounted on said shaft and a flat projecting portion in sliding engagement with said plate and carrying a pin, a second plate having a face in sliding engagement with said projecting portions of the housings and having slots for the passage of said pins, a stud carried by the first mentioned plate and extending through and projecting from said second plate, a disc mounted on said stud in sliding engagement with the face of said second plate which does not engage said projecting portions, said disc having radial grooves for slidably receiving said pins, said disc being rotatable in opposite directions simultaneously to displace said pins and therefore said housings, away from and toward one another to effect interocular adjustment of the binocular, and means mounted on said stud for maintaining the aforementioned disc, second plate, projecting portions, and first mentioned plate in successively contacting and sliding relationship.

STEN JOHANSON.

REFERENCES CITED

The following references are of record in the file of this patent:

UNITED STATES PATENTS

| Number | Name | Date |
|---|---|---|
| 1,501,059 | Metz | July 15, 1924 |

FOREIGN PATENTS

| Number | Country | Date |
|---|---|---|
| 364,747 | Germany | Dec. 1, 1922 |
| 489,509 | France | Oct. 5, 1918 |
| 135,752 | Great Britain | Dec. 4, 1919 |
| 97,270 | Germany | Aug. 10, 1897 |